United States Patent [19]

Whitford

[11] Patent Number: 5,064,205
[45] Date of Patent: Nov. 12, 1991

[54] ACTIVE MAGNETIC SEAL

[75] Inventor: Robert P. Whitford, Sterling, Mass.

[73] Assignee: General Electric Company, Schenectady, N.Y.

[21] Appl. No.: 527,520

[22] Filed: May 23, 1990

[51] Int. Cl.⁵ .............................................. F16J 9/00
[52] U.S. Cl. .................................... 277/80; 277/2; 277/28; 277/53
[58] Field of Search .............. 277/2, 28, 80, 3, 53, 277/55, 96.2

[56] References Cited

U.S. PATENT DOCUMENTS

| | | | |
|---|---|---|---|
| 3,184,244 | 5/1965 | Van Vleet . | |
| 3,449,653 | 3/1970 | Gardner | 277/27 |
| 3,460,844 | 8/1969 | Whittle . | |
| 3,708,177 | 1/1973 | Baermann | 277/80 |
| 3,749,411 | 7/1973 | Lennon | 277/2 |
| 4,429,883 | 2/1984 | Nakanishi | 277/53 |
| 4,434,987 | 3/1984 | Albers et al. . | |
| 4,447,063 | 5/1984 | Kotzur et al. . | |
| 4,455,026 | 6/1984 | Pinkus et al. . | |
| 4,575,103 | 3/1986 | Pedu . | |
| 4,643,437 | 2/1987 | Salant et al. | 277/28 |
| 4,669,735 | 6/1987 | Sundberg et al. | 277/28 |
| 4,671,679 | 6/1987 | Hesmat . | |
| 4,722,534 | 2/1988 | Wentworth | 277/28 |

OTHER PUBLICATIONS

*Power Engineering*/Jan. 1990, "Magnetic Bearings Can Increase Availability, Reduce O&M Costs", Gray et al.

*Primary Examiner*—William A. Cuchlinski, Jr.
*Assistant Examiner*—Daniel G. DePumpo
*Attorney, Agent, or Firm*—Nixon & Vanderhye

[57] ABSTRACT

An active magnetic seal for controlling leakage from turbine shafts or other rotating equipment by the inclusion of circumferential electromagnet windings forming a dynamically controllable magnetic gap between the axial borders of rotor and stator elements.

19 Claims, 2 Drawing Sheets

ACTIVE MAGNETIC SEAL

FIELD OF THE INVENTION

The disclosed exemplary embodiments relate to sealing arrangements of the kind used on a rotating shaft of a turbine or other rotating equipment.

BACKGROUND AND SUMMARY OF THE INVENTION

Sealing arrangements such as labyrinth seals, carbon seals and mechanical face seals for controlling leakage from rotating equipment are known as are their advantages and disadvantages.

Labyrinth seals, for example, used in steam turbines are non-contacting and, therefore, have long life but their relatively high leakage rates require an auxiliary gland seal system. Such gland seal systems include highly complex and heavy seal regulators for reducing high pressure steam to the few pounds per square inch pressure required for gland sealing. Additional complexities and equipment involve several valves, high and low pressure drains, air ejectors and exhaust condenser as well as steam and air exhaust piping. The weight and space requirements of such system are high. For example, such support equipment in a typical ship's engine room has been estimated to weigh 3 tons.

Carbon ring seals, on the other hand, are contacting seals which tend to minimize steam leakage, but the contact between parts leads to relatively high wear rates.

Rotary gap type seals are also known such as that shown in U.S. Pat. No. 3,499,653 issued to Gardner, which teaches gas seals that are non-contacting at high speed and which control leakage by using hydrodynamic forces to control separation between sealing faces. At low speeds and/or pressures, however, some contact usually occurs resulting in wear and possible damage.

It is also known, as illustrated in U.S. Pat. Nos. 4,434,987 and 4,447,063, to use an electromagnet for controlling a gap between a rotating ring and a surrounding non-rotating ring in shaft seals wherein sealing fluid is pumped into the gap and exhausted through a bore in the stator elements. These devices also include an elastic bellows member for exerting an axial force on the non-rotating seal ring.

The object of the disclosed seal system is to overcome the limitations of the prior art systems by minimizing gas leakage, weight, space requirements and costs while increasing wear life.

Briefly stated, I have discovered that such objects may be obtained by the inclusion of one or more spring biased cylindrically shaped electromagnets disposed in stator elements on both sides of a rotating ring fixed to the shafts to be sealed. The gaps between the ring and the spring loaded magnets are boundary seals and may be closely controlled to maintain a small clearance completely around the circumference of the ring and the shaft on which it is mounted. Such an arrangement does not require elaborate sealing fluid pumping means and exhaust vents as used in the prior art. Moreover, the inclusion of rotor position sensing means, which will detect the distance between stator and rotor and hence the gap size, in combination with an electronic controller permits the boundary seal clearance to be dynamically controlled.

Still further, the arrangement allows the inclusion of a geometric labyrinth seal as a secondary sealing arrangement, thus increasing the safety factor of the disclosed shaft seal which is useful for controlling leakage from steam/gas turbines, compressors and other rotating equipment.

BRIEF DESCRIPTION OF THE DRAWINGS

These as well as other objects and advantages of this invention will be more completely appreciated by carefully studying the following detailed description of a presently preferred exemplary embodiment of this invention in conjunction with the accompanying drawings in which.

DETAILED DESCRIPTION OF THE DRAWINGS

Figure 1:
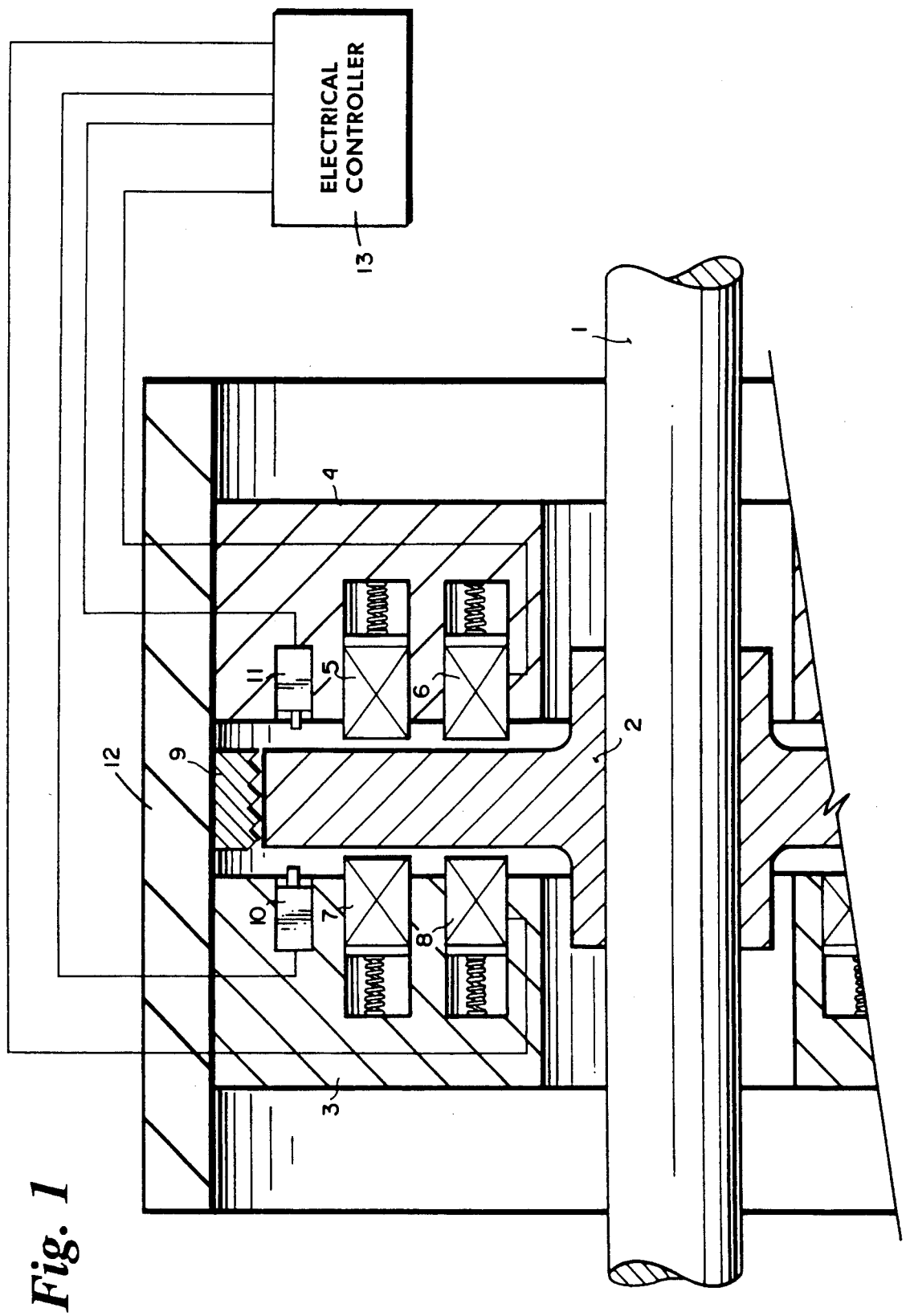
FIG. 1 is a partial radial cross section of the exemplary shaft seal.

The exemplary embodiment of my active magnetic seal combines the developing technologies of magnetic bearings and dry running gas seals whereby a dynamically controlled magnetic gap between stator and rotor faces is obtained for the purpose of minimizing gas leakage, wear, complexity and costs. FIG. 1 shows the basic components for the proposed embodiment and includes a shaft 1 of a turbine or the like with a rotor ring 2 mounted on the shaft which extends in a radial direction toward the stator and about the complete circumference of the shaft. The rotor ring consists of a stack of ferromagnetic laminations without slots or windings.

Stator elements 3 and 4 fixed to a housing portion 12 are also made up of stacked ferromagnetic laminations which extend completely about the circumference of the shaft 1. The stator elements, however, are slotted in the circumferential direction and include windings 5, 6, 7 and 8 which also extend completely about the periphery of the shaft.

The windings are axially movable but closely received in the slots and are also spring biased as schematically illustrated in the drawing. Arranged as illustrated the electromagnet windings of the stator are spring biased and are free to move so as to maintain a very close axial spacing with the rotor. The rotor and/or stator may also be spring backed in order to allow either or both to float in order to compensate for thermal expansions, vibrations, etc. which tend to open or close the gap between the stator and rotor faces.

The electromagnetic windings extending completely about the circumference of the shaft and in the general relationship to the rotor ring as illustrated, form boundary seals on both sides of the rotor and may be arranged to maintain a very small clearance between the windings and the rotor under both static and dynamic conditions.

The exemplary arrangement illustrated also allows the inclusion of a labyrinth seal at the outer radial end of the rotor ring whereby an additional sealing arrangement is obtained. Although the sealing effect of element 9 is secondary to that provided by the movable windings, such secondary or back up sealing nevertheless increases the overall sealing capacity of the illustrated arrangement as well as providing a safety feature in the event that the primary sealing arrangement failed.

FIG. 1 additionally illustrates the placement of position sensors 10 and 11 which detect the displacement of the rotor and stator faces. The magnetic fields generated by the electromagnets are modulated as a function of the axial position of the rotor vis-a-vis the stator faces. This position in turn is controlled by electrical controller 13 and electromagnets 5, 6, 7, 8 in response to the signals generated by the position sensors in comparison to a reference signal representative of a desired zero axial position which occurs where the magnetic gap between stator and rotor faces are equal on both sides of the rotor ring.

Figure 2:
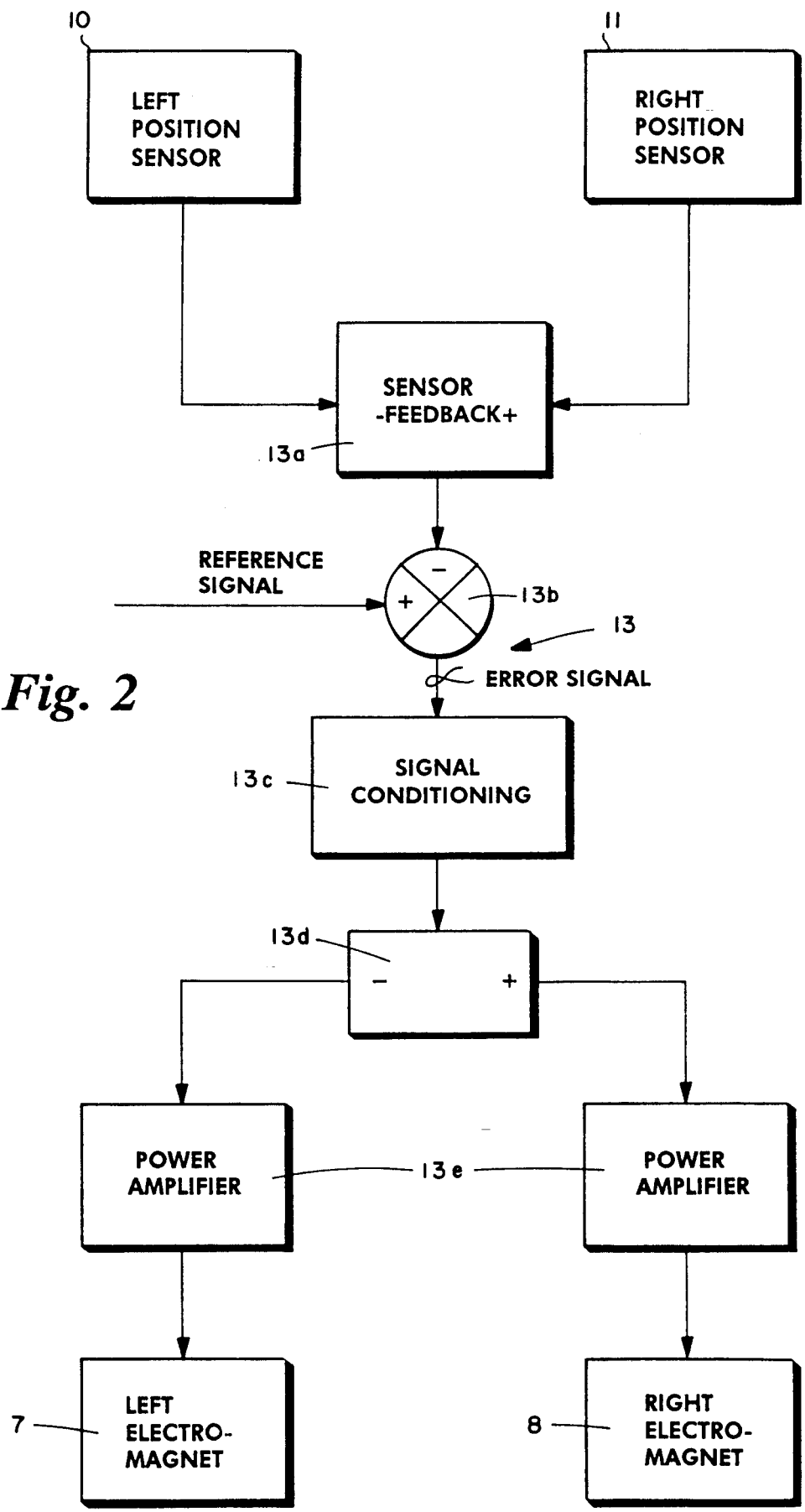
FIG. 2 is an exemplary embodiment of an electrical controller for dynamically controlling the magnetic gap between stator and rotor faces.

If the position of the rotor shifts, an electronic controller 13 such as that which is illustrated in FIG. 2 will detect the displacement in cooperation with the position sensor. Thereafter, current will be directed to the appropriate electromagnet(s) and the electromagnets will in turn respectively push and pull the stator and rotor toward the desired zero axial position.

The circuitry of FIG. 2 is an exemplary embodiment of an electronic control loop for dynamically controlling the magnetic gap between the stator and rotor faces for leakage control. Such circuitry could also be implemented using analog or digital computers responsive to the position sensors for determining appropriate corrective action and directing amplified signals to the electromagnets.

The position sensors 10 and 11 provide a continuous feedback to sensor 13a where the signals are combined and subsequently compared by comparator 13b with a reference signal to form an error signal that is shaped or conditioned at 13c and split or divided at 13d to form signals of appropriate magnitude and polarity which may be used to control the electromagnets after amplification 13e to push and/or pull the stator and rotor elements to their nominal position and thus maintain a clearance of approximately a mil between the rotor and magnet windings which form the boundary seals on both sides of the rotor.

Although some leakage of a relatively high pressure fluid on one side of the rotor may pass to a relatively low pressure atmosphere, on the other side of the rotor, such leakage is minimized by dynamically maintaining the relatively small gaps between the magnet windings and the rotor. Additionally, labyrinth seal 9 provides a sealing function, albeit of a secondary or backup nature. Thus, the disclosed sealing arrangement has relatively low leakage and, since it is non-contacting, it is non-wearing. Additionally it is relatively simple in comparison to other prior art seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A magnetic seal for a rotating shaft, said seal comprising:
   a rotating ring fixed to the shaft, said ring having opposing side surfaces extending in the radial direction with an end surface connecting said side surfaces;
   stator elements extending circumferentially around said shaft on at least one side of said ring with radially extending surfaces spaced from and facing said side surfaces of said ring;
   said stator elements including circumferential grooves in the radially extending surfaces facing the side surfaces of said ring;
   electrical windings formed in said grooves and extending beyond said radially extending surfaces toward the side surfaces of said ring to form pairs of seal gaps for controlling the leakage between the rotating ring and stator elements; and
   an electrical control loop for supplying power to said windings for magnetically correcting axial displacements between said ring and said stator elements to maintain said gaps between said windings and said ring.

2. A magnetic seal as in claim 1 further including resilient elements in said grooves below said windings whereby said windings are free to resiliently move in an axial direction to maintain a close axial spacing with said rotating ring.

3. A magnetic seal as in claim 1 including stator elements on both sides of said ring and further including a housing element connecting said stator elements so as to substantially enclose said end surface of the rotating ring between said gaps.

4. A magnetic seal as in claim 3 further including a labyrinth seal located between said housing element and said end surface of the rotating ring.

5. A magnetic seal as in claim 1 wherein the rotating ring and stator elements are formed of stacked laminations of ferromagnetic material.

6. A magnetic seal as in claim 1 wherein the electrical control loop includes position sensors for producing signals indicative of the relative displacements between said windings and the side surfaces of said rotating ring.

7. A magnetic seal as in claim 6 wherein the electrical control loop further includes a comparator for comparing the sensor signals with a reference signal to produce an error signal indicative of the magnitude and direction of the magnetic corrective action to be applied by said windings.

8. A magnetic seal as in claim 1 wherein said shaft is a turbine shaft and said seal controls leakage of high pressure gases along the shaft.

9. A process for providing dynamically controlled magnetic gaps between stator and rotor faces to control leakage along a rotating shaft, said process comprising:
   fixing a radially extending rotor ring with opposing side surfaces to said shaft, said side surfaces being connected by an axial extending surface;
   providing stator ring elements with radially extending surfaces spaced from and facing said side surfaces of the rotor ring, said stator elements including axially extending circumferential grooves in said radially extending surfaces;
   providing electromagnet windings in said grooves and extending axially form said grooves such that a gap is formed between each winding and said rotor side surfaces;
   sensing the linear gap displacements at each said rotor side surface, and in response to said sensing;
   supplying electrical power to said windings of an appropriate magnitude and polarity as to magnetically correct axial displacements between said stator elements and said rotor ring so as to control said gaps to have substantially equal displacements, said displacements being sufficiently small as to effectively control leakage along said shaft.

10. A process as specified in claim 9 further including the step of spring biasing said windings in said grooves so that said windings are free to move in an axial direction to maintain close axial spacing with said rotor ring.

11. A process as specified in claim 9 further including the step of providing a labyrinth seal at said axial extending surface of the rotor ring to provide additional sealing capacity.

12. A process as specified in claim 9 wherein the power applied to said windings acts on stacked laminations of ferromagnetic material in said rotor ring and stator elements to dynamically adjust said gaps.

13. A process as specified in claim 9 further including the step of resiliently biasing said windings in an axial direction.

14. A rotating shaft sealing apparatus comprising:
   rotor ring means carried on said shaft for providing radially extending sealing surfaces connected by an axially extending surface;
   stator ring means for providing radially extending surfaces located adjacent to said rotor means radial surfaces, said stator ring surfaces including circumferential grooves;
   ring-shaped electrical winding means extending from said grooves toward said rotor ring radial surfaces for forming dynamically controllable magnetic boundary sealing gaps;
   electrical control means for detecting the relative differences in the axial gap dimensions and for applying power to said windings to exert a corrective action whereby said axial gap dimensions are maintained substantially equal.

15. An apparatus as in claim 14 wherein said windings are resiliently mounted in said grooves.

16. An apparatus as in claim 14 further including a labyrinth seal means at said axial extending surface of said rotor means.

17. Apparatus as in claim 14 wherein said rotor and stator means are formed of stacked laminations of ferromagnetic material.

18. The apparatus of claim 14 wherein the shaft is a turbine shaft and the apparatus controls leakage of high pressure gases along the shaft.

19. The apparatus of claim 14 wherein the windings are resiliently biased in an axial direction.

* * * * *